(12) United States Patent
Ma et al.

(10) Patent No.: US 12,500,972 B2
(45) Date of Patent: Dec. 16, 2025

(54) SUPPORT STRUCTURE FOR PROTECTIVE HOUSING OF ELECTRONIC PRODUCT

(71) Applicants: Wenhong Ma, Guangdong (CN); Jiawei Gao, Guangdong (CN)

(72) Inventors: Wenhong Ma, Guangdong (CN); Jiawei Gao, Guangdong (CN)

(73) Assignee: Guangdong Shuowei Technology Co., Ltd., Dongguan (CN)

( * ) Notice: Subject to any disclaimer, the term of this patent is extended or adjusted under 35 U.S.C. 154(b) by 319 days.

(21) Appl. No.: 18/379,200

(22) Filed: Oct. 12, 2023

(65) Prior Publication Data

US 2024/0089359 A1    Mar. 14, 2024

(51) Int. Cl.
*H04M 1/04*      (2006.01)
*G06F 1/16*      (2006.01)
*H04B 1/3888*    (2015.01)

(52) U.S. Cl.
CPC ............ *H04M 1/04* (2013.01); *G06F 1/1626* (2013.01); *G06F 1/166* (2013.01); *H04B 1/3888* (2013.01)

(58) Field of Classification Search
CPC ................ G06F 1/1626; G06F 1/1628; G06F 2200/1633; A45F 5/00; A45F 5/1525; H04M 1/3888; H04M 1/04
See application file for complete search history.

(56) References Cited

U.S. PATENT DOCUMENTS

| 11,815,950 | B2* | 11/2023 | Ma | ............................. A45F 5/00 |
| 12,099,382 | B1* | 9/2024 | Shi | ......................... G06F 1/1626 |
| 12,338,869 | B1* | 6/2025 | Ma | ......................... F16F 1/3605 |
| 2014/0347814 | A1* | 11/2014 | Zaloom | ..................... G06F 1/16 |
| | | | | 248/688 |
| 2024/0089359 | A1* | 3/2024 | Ma | .......................... H04M 1/04 |

* cited by examiner

*Primary Examiner* — Patrick F Marinelli (57) ABSTRACT

A support structure for a protective housing of an electronic product includes a support assembly including a protective housing connection plate, a slant support plate, and a support plate. One end of the slant support plate is disposed on a side of the protective housing connection plate in a rotation manner through a first rotating shaft, a torsion spring is sleeved on the first rotating shaft, and the other end of the slant support plate is disposed on a side of the support plate in the rotation manner of a second rotating shaft. One end of the support plate is disposed on the side of the protective housing connection plate in a sliding manner through a sliding shaft.

10 Claims, 9 Drawing Sheets

SUPPORT STRUCTURE FOR PROTECTIVE HOUSING OF ELECTRONIC PRODUCT

BACKGROUND OF THE INVENTION

1. Field of the Invention

The invention relates to electronic product accessories and more particularly to a support structure for a protective housing of an electronic product.

2. Description of Related Art

A support for a protective housing of an electronic product is installed on a protective housing of a battery product, and used to support the protective housing of the electronic product at an angle. However, an existing support for a protective housing has the following advantages in use:

An existing common support structure for a protective housing with a support has a single structure. The support needs to be manually accommodated after being expanded. This accommodation manner is poor in stability and inflexible in use. The support structure may be collided and shaken in an accommodation process. As a result, the support may be unfolded, and therefore, effect of use is unsatisfactory.

Thus, the need for improvement still exists.

SUMMARY OF THE INVENTION

To achieve the above aims, the invention provides the following solutions: A support structure for a protective housing of an electronic product includes a support assembly. The support assembly includes a protective housing connection plate, a slant support plate, and a support plate. One end of the slant support plate is disposed on a side of the protective housing connection plate in a rotation manner through a rotating shaft I, a torsion spring is sleeved on the rotating shaft I, and the other end of the slant support plate is disposed on a side of the support plate in the rotation manner of a rotating shaft II. One end of the support plate is disposed on the side of the protective housing connection plate in a sliding manner through a sliding shaft, and a hook that is configured to limit the sliding shaft is disposed in an inner part of the protective housing connection plate.

By flipping the support plate, the support plate drives the sliding shaft to slide in the inner part of the protective housing connection plate and is clamped with the hook. In this process, the slant support plate is pulled by the support plate, to flip and compress the torsion spring, the support plate is flipped to drive the sliding shaft to separate from the clamping with the hook, and by loosening the support plate, the slant support plate is rebounded by the torsion spring, to drive the support plate to flip and to be accommodated in the inner part of the protective housing connection plate.

As a preferred technical solution of the invention, the protective housing connection plate includes an inner partition plate and an outer partition plate. A rotating groove and a sliding groove are internally opened on a side of the outer partition plate. The hook is disposed on a side of the inner partition plate, and one end, away from the inner partition plate, of the hook extends into an inner part of the sliding groove.

As a preferred technical solution of the invention, the rotating shaft I is disposed in an inner part of the rotating groove in the rotation manner. The sliding shaft is disposed in the inner part of the sliding groove in the sliding manner. A hinge base is internally disposed on the side of the support plate. The rotating shaft II is disposed in an inner part of the hinge base in the rotation manner.

As a preferred technical solution of the invention, at least one limiting card that is clamped with one end of the torsion spring is disposed on a side of the slant support plate, and a clamping groove that is clamped with the other end of the torsion spring is internally opened on the side of the outer partition plate.

As a preferred technical solution of the invention, a handle groove is opened on one end, away from the sliding shaft, of the support plate, and a handle hole is opened in an inner part of the support plate.

As a preferred technical solution of the invention, an accommodation groove that is configured to accommodate the one end of the torsion spring and the limiting card is internally opened on the side of the outer partition plate, and the accommodation groove is connected to the rotating groove.

As a preferred technical solution of the invention, at least one protrusion is distributed with a same spacing in a circular shape on an edge of the inner partition plate.

As a preferred technical solution of the invention, the support structure further includes a protective housing assembly. The protective housing assembly includes a shell, a middle shell disposed in an inner part of the shell. A surface cover disposed on a side of the middle shell.

As a preferred technical solution of the invention, a through hole that is configured to install the support assembly is opened in an inner part of the middle shell. At least one adjustment groove is distributed with a same spacing on a side of the through hole, and the protrusion is clamped with the adjustment groove.

As a preferred technical solution of the invention, a positioning buckle is disposed at four edges each of the middle shell, and a positioning groove is disposed at four edges each of the surface cover. The positioning buckle is clamped with the positioning groove. A pen groove is opened in an inner part of the surface cover.

Compared with a conventional technology, the invention provides a support structure for a protective housing of an electronic product, which has the following beneficial effects:

Compared with a support for a protective housing on the market, according to the support structure for a protective housing of an electronic product, a rebound force is continuously applied to the slant support plate and the support plate through the torsion spring. Therefore, the support plate is more stable when being clamped with the hook, and the support plate and the slant support plate are more stably accommodated. When the support plate is separated from limitation of the hook, the torsion spring automatically drives the support plate and the slant support plate to be folded and accommodated. Therefore, operations are simple and fast, usage is more flexible, a structure is simplified streamlined structure, economic benefits are achieved, and an application prospect is board.

The above and other objects, features and advantages of the invention will become apparent from the following detailed description taken with the accompanying drawings.

DETAILED DESCRIPTION OF THE INVENTION

Referring to FIGS. 1 to 9, a support structure for a protective housing of an electronic product of the invention comprises a support assembly 1. The support assembly 1 includes a protective housing connection plate 11 a slant support plate 12, and a support plate 13. One end of the slant support plate 12 is disposed on a side of the protective housing connection plate 11 in a rotation manner through a rotating shaft I 14, a torsion spring 15 is sleeved on the rotating shaft I 14, and the other end of the slant support plate 12 is disposed on a side of the support plate 13 in the rotation manner of a rotating shaft II 16. One end of the support plate 13 is disposed on the side of the protective housing connection plate 11 in a sliding manner through a sliding shaft 17, and a hook 18 that is configured to limit the sliding shaft 17 is disposed in an inner part of the protective housing connection plate 11.

By flipping the support plate 13, the support plate 13 drives the sliding shaft 17 to slide in the inner part of the protective housing connection plate 11 and is clamped with the hook 18. In this process, the slant support plate 12 is pulled by the support plate 13, to flip and compress the torsion spring 15, the support plate 13 is flipped to drive the sliding shaft 17 to separate from the clamping with the hook 18, and by loosening the support plate 13, the slant support plate 12 is rebounded by the torsion spring 15, to drive the support plate 13 to flip and to be accommodated in the inner part of the protective housing connection plate 11.

As a specific technical solution of the invention, the protective housing connection plate 11 includes an inner partition plate 111 and an outer partition plate 112. A rotating groove 113 and a sliding groove 114 are internally opened on a side of the outer partition plate 112. The hook 18 is disposed on a side of the inner partition plate 111, and one end, away from the inner partition plate 111, of the hook 18 extends into an inner part of the sliding groove 114.

Figure 6:
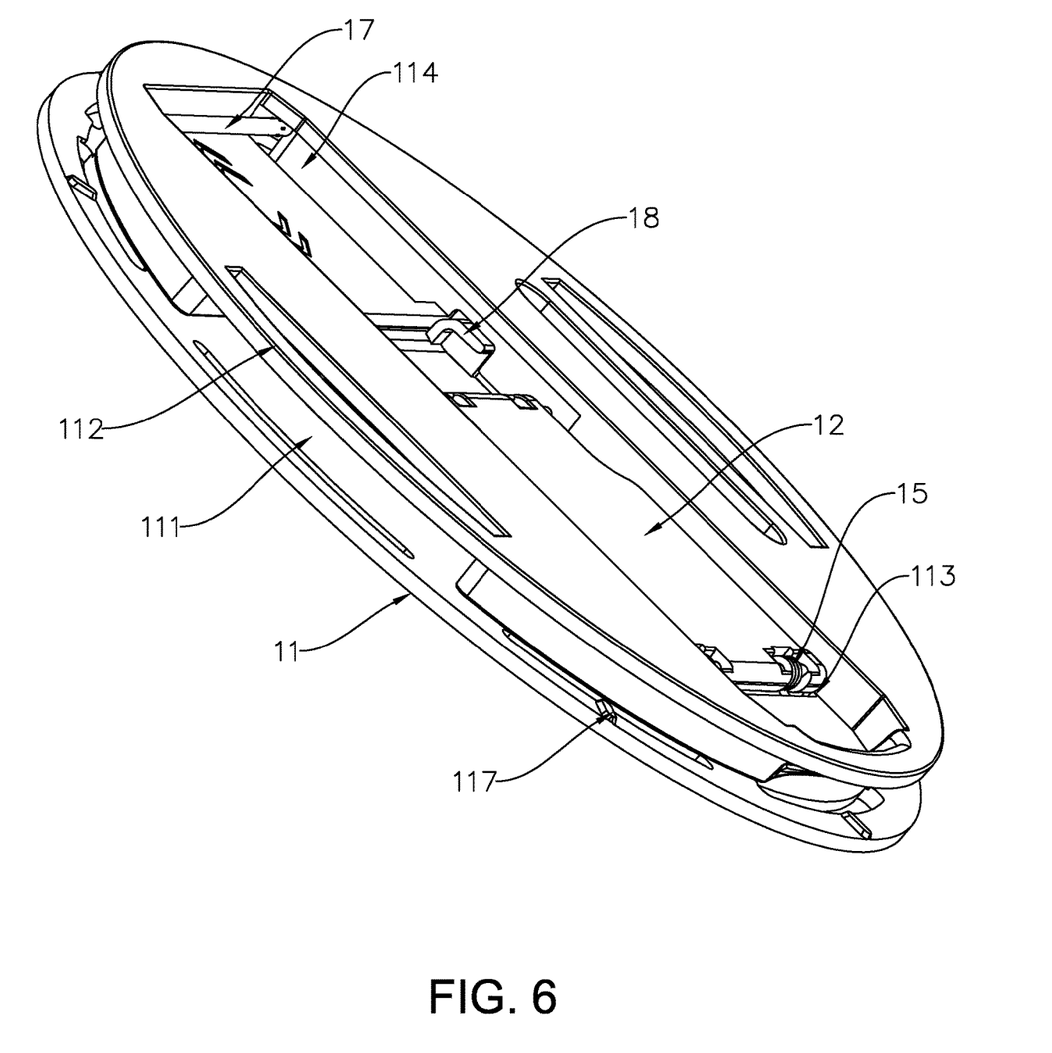
FIG. 6 is a schematic diagram of a structure of a sliding groove of a support structure for a protective housing of an electronic product according to the invention.

As a specific technical solution of the invention, the rotating shaft I 14 is disposed in an inner part of the rotating groove 113 in the rotation manner. The sliding shaft 17 is disposed in the inner part of the sliding groove 114 in the sliding manner. A hinge base 131 is internally disposed on the side of the support plate 13. The rotating shaft II 16 is disposed in an inner part of the hinge base 131 in the rotation manner. Refer to FIG. 6. When the support plate 13 drives the sliding shaft 17 to slide in the inner part of the sliding groove 114, the sliding shaft 17 slides underneath the hook 18. As shown in FIG. 6, the inner part of the sliding groove 114 is located on a side of the hook 18, and enough space for the sliding shaft 17 to move upward and downward is reserved. The support plate 13 continuously slides to apply an upward force on the sliding shaft 17, to enable the sliding shaft 17 to be opposite to the hook 18. In this case, by loosening the support plate 13, the support plate 13 and the sliding shaft 17 slide in an opposite direction due to rebound of the torsion spring 15, and the sliding shaft 17 is clamped into the inner part of the hook 18 due to limitation of the hook 18 and continuously resisted by the rebound force of the torsion spring 15. Therefore, the sliding shaft 17 may be stably clamped in the inner part of the hook 18. When the support plate 13 is accommodated, the support plate 13 is continuously flipped to drive the sliding shaft 17 to be separately from the inner part of the hook 18. When the support plate 13 is pulled, the support plate 13 drives the sliding shaft 17 to move to a bottom of the hook 18. When the support plate 13 is released, under an action of the rebound force of the torsion spring 15, the slant support plate 12 resets to pull the support plate 13, so as to drive the sliding shaft 17 to reset. Therefore, the support plate 13 may be accommodated in the inner part of the outer partition plate 112. After the support plate 13 accommodated, a side of the support plate 13 and a side of the outer partition plate 112 are maintained in a same plane. This is beautiful in appearance and comfortable to touch.

As a specific technical solution of the invention, at least one limiting card 121 that is clamped with one end of the torsion spring 15 is disposed on a side of the slant support plate 12, and a clamping groove 115 that is clamped with the other end of the torsion spring 15 is internally opened on the side of the outer partition plate 112. Due to disposing of the limiting card 121 and the clamping groove 115, two ends of the torsion spring 15 are limited. This ensures stability of the torsion spring 15 during compression and rebound.

Figure 1:
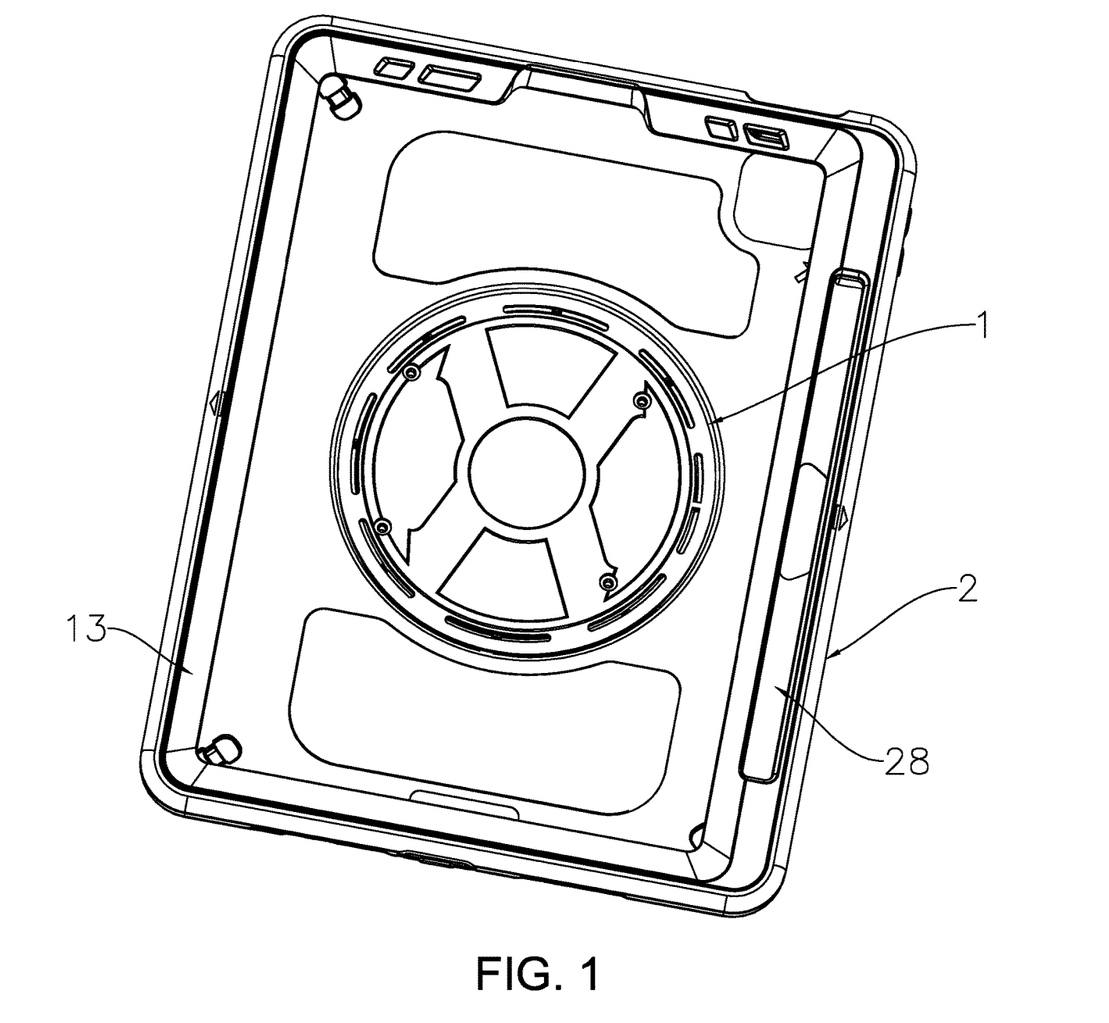
FIG. 1 is a schematic diagram of a structure of a support structure for a protective housing of an electronic product according to the invention.
Figure 2:
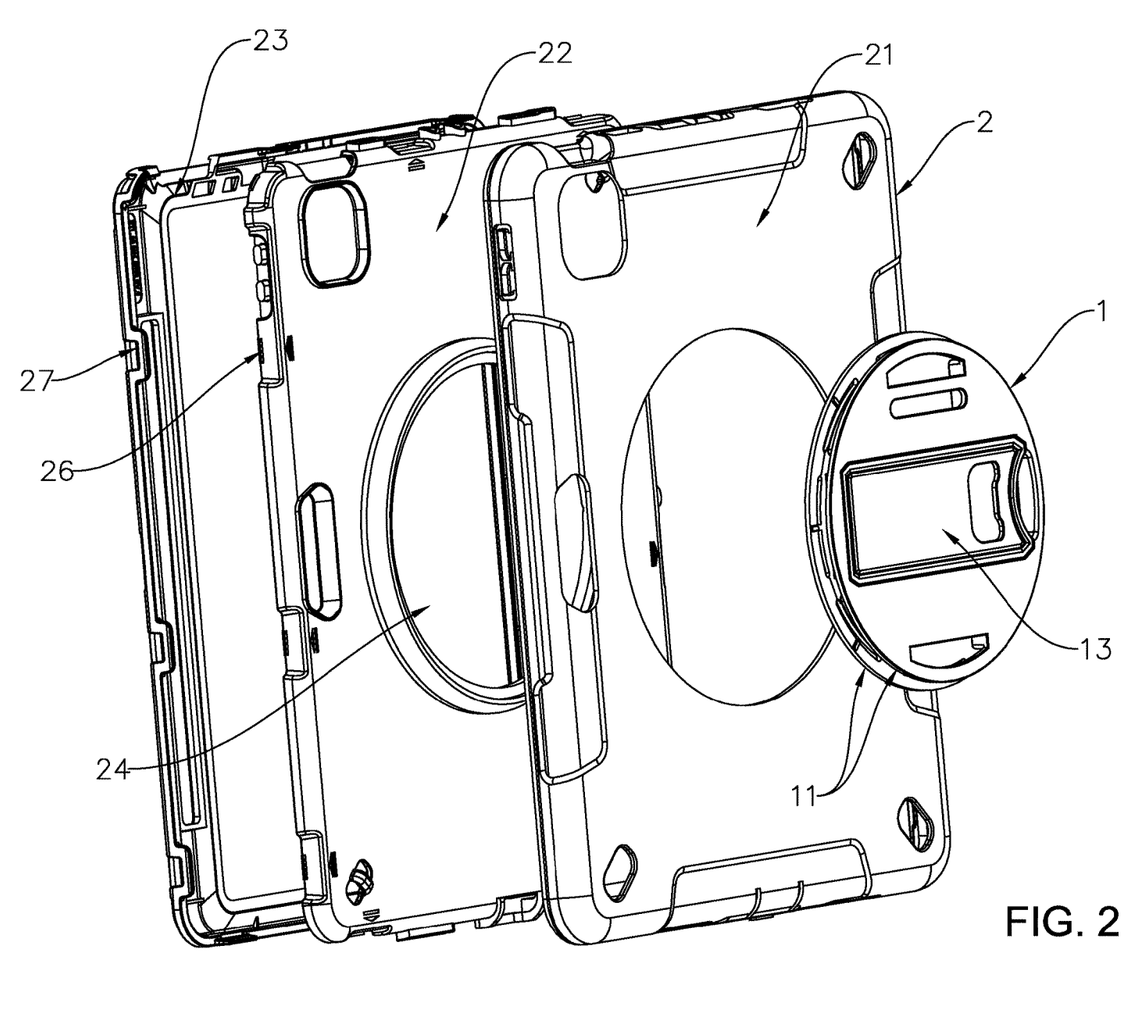
FIG. 2 is an exploded view of a structure of a protective housing assembly of a support structure for a protective housing of an electronic product according to the invention.
Figure 3:
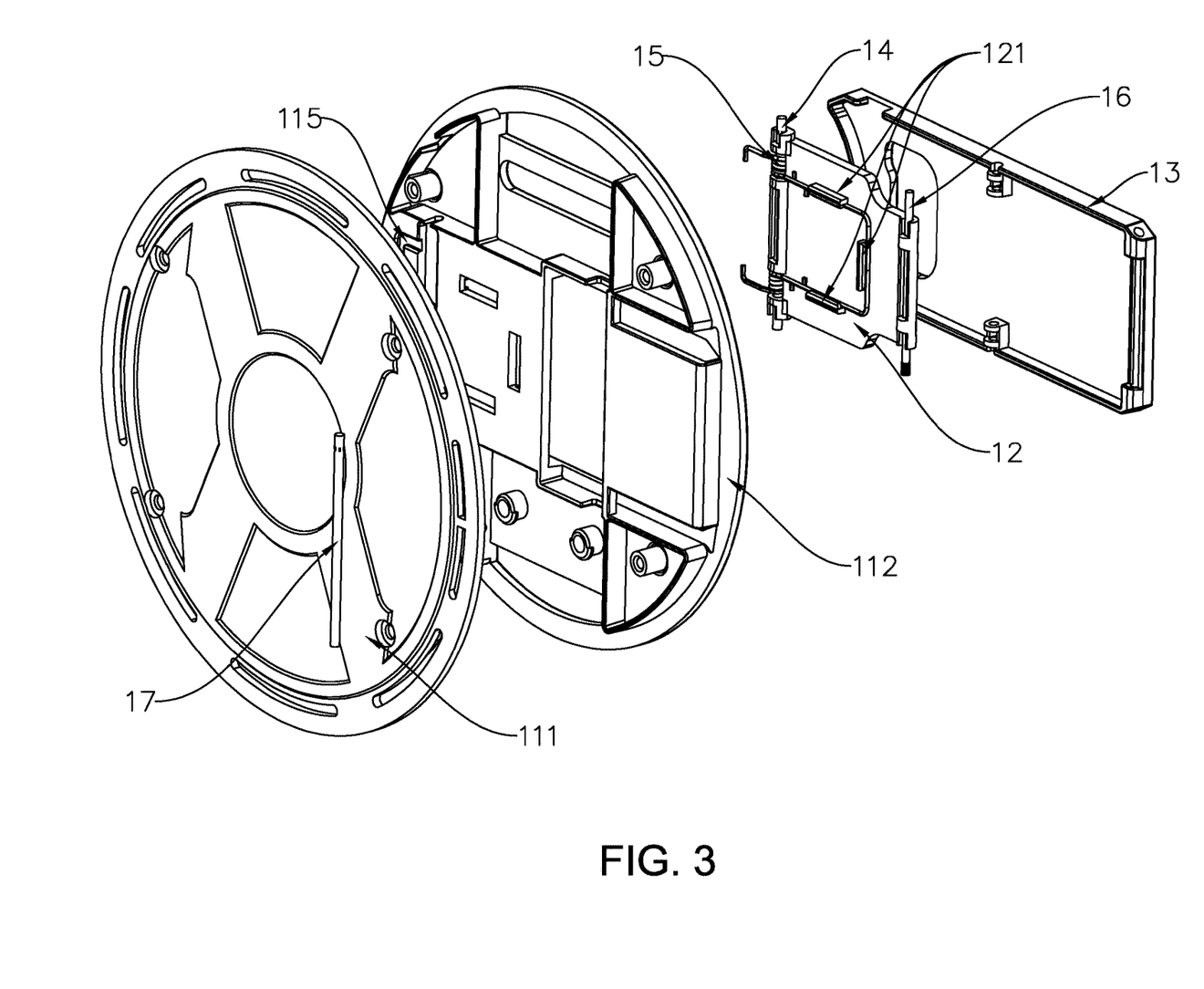
FIG. 3 is a schematic diagram of a structure of a support assembly of a support structure for a protective housing of an electronic product according to the invention.
Figure 4:
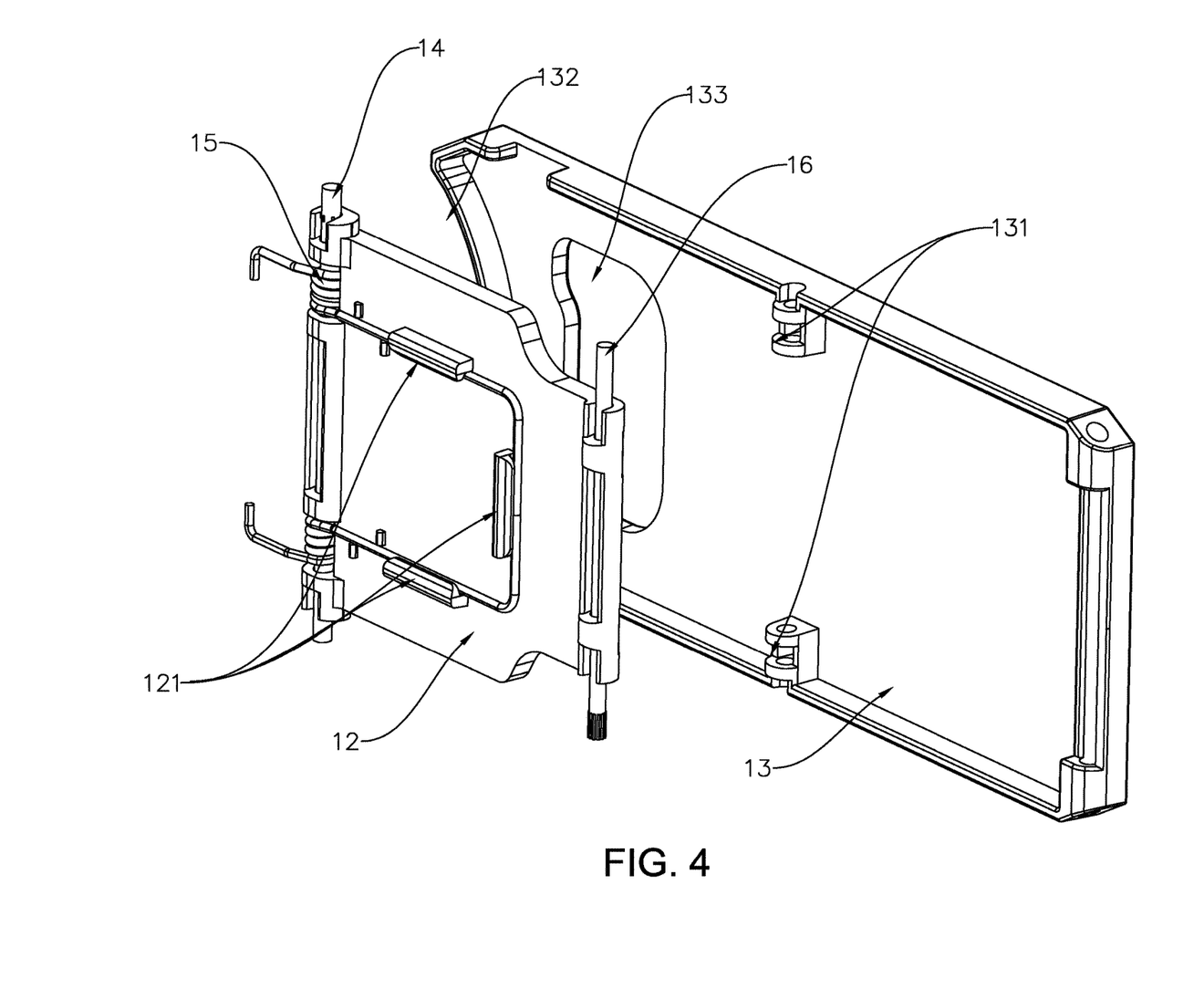
FIG. 4 is a schematic diagram of a structure of a slant support plate of a support structure for a protective housing of an electronic product according to the invention.
Figure 5:
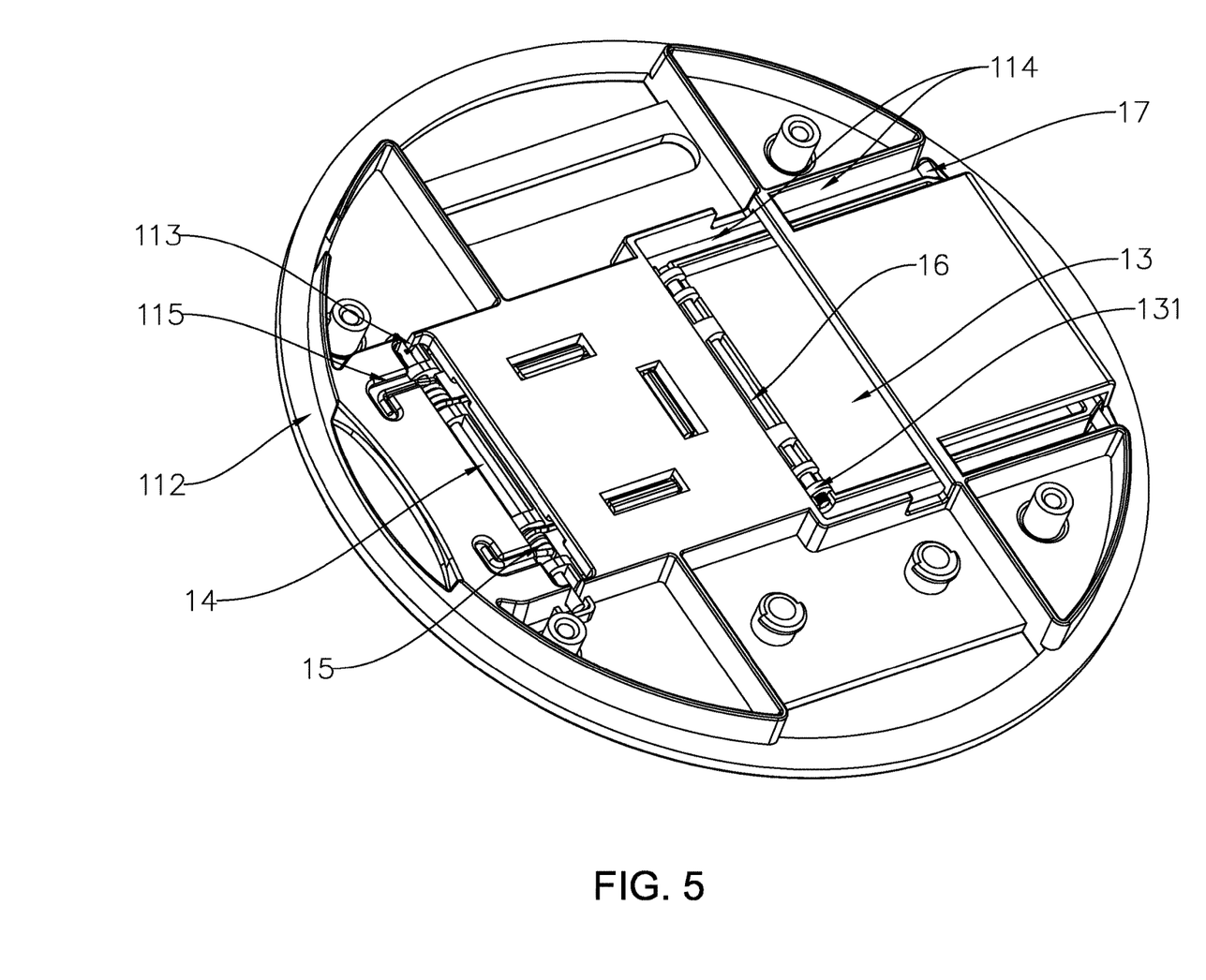
FIG. 5 is a schematic diagram of a structure of an outer partition plate of a support structure for a protective housing of an electronic product according to the invention.

As a specific technical solution of the invention, a handle groove 131 is opened on one end, away from the sliding shaft 17, of the support plate 13, and a handle hole 132 is opened in an inner part of the support plate 13. Refer to FIG. 4. Due to disposing of the handle groove 131 and the handle hole 132, a user can conveniently flip the support plate 13.

As a specific technical solution of the invention, an accommodation groove 116 that is configured to accommodate the one end of the torsion spring 15 and the limiting card 121 is internally opened on the side of the outer partition plate 112, and the accommodation groove 116 is connected to the rotating groove 113. Due to disposing of the accommodation groove 116, the torsion spring 15 and limiting card 121 on the side of the slant support plate 12 may be accommodated and avoided. Therefore, the slant support plate 12 may be more stably accommodated in the inner part of the outer partition plate 112.

As a specific technical solution of the invention, at least one protrusion 117 is distributed with a same spacing in a circular shape on an edge of the inner partition plate 111. The support structure for a protective housing of an electronic product further includes a protective housing assembly 2. The protective housing assembly 2 includes a shell 21, a middle shell 22 disposed in an inner part of the shell 21, and a surface cover 23 disposed on a side of the middle shell 22.

Figure 7:
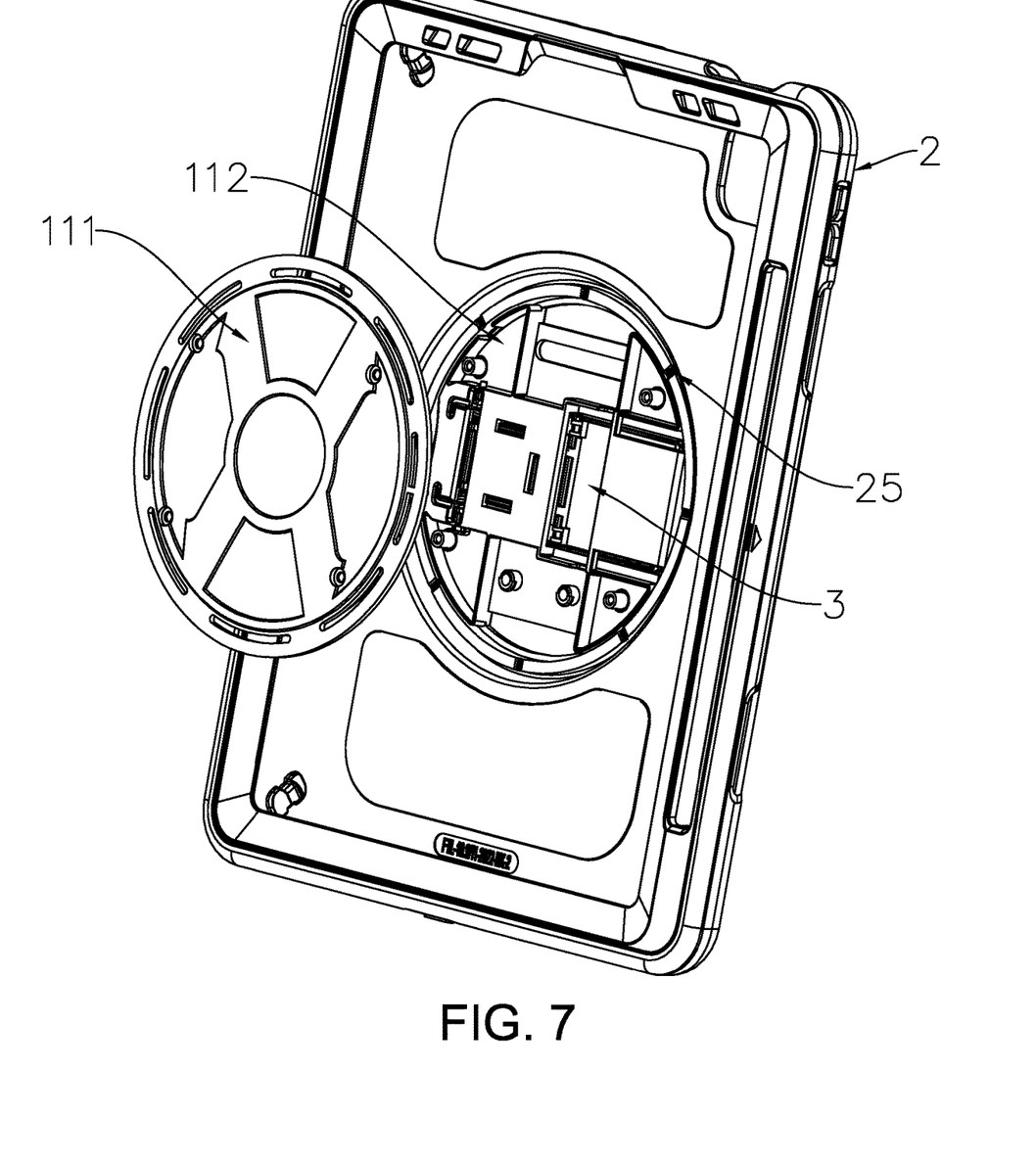
FIG. 7 is a schematic diagram of a structure of an adjustment groove of a support structure for a protective housing of an electronic product according to the invention.
Figure 8:
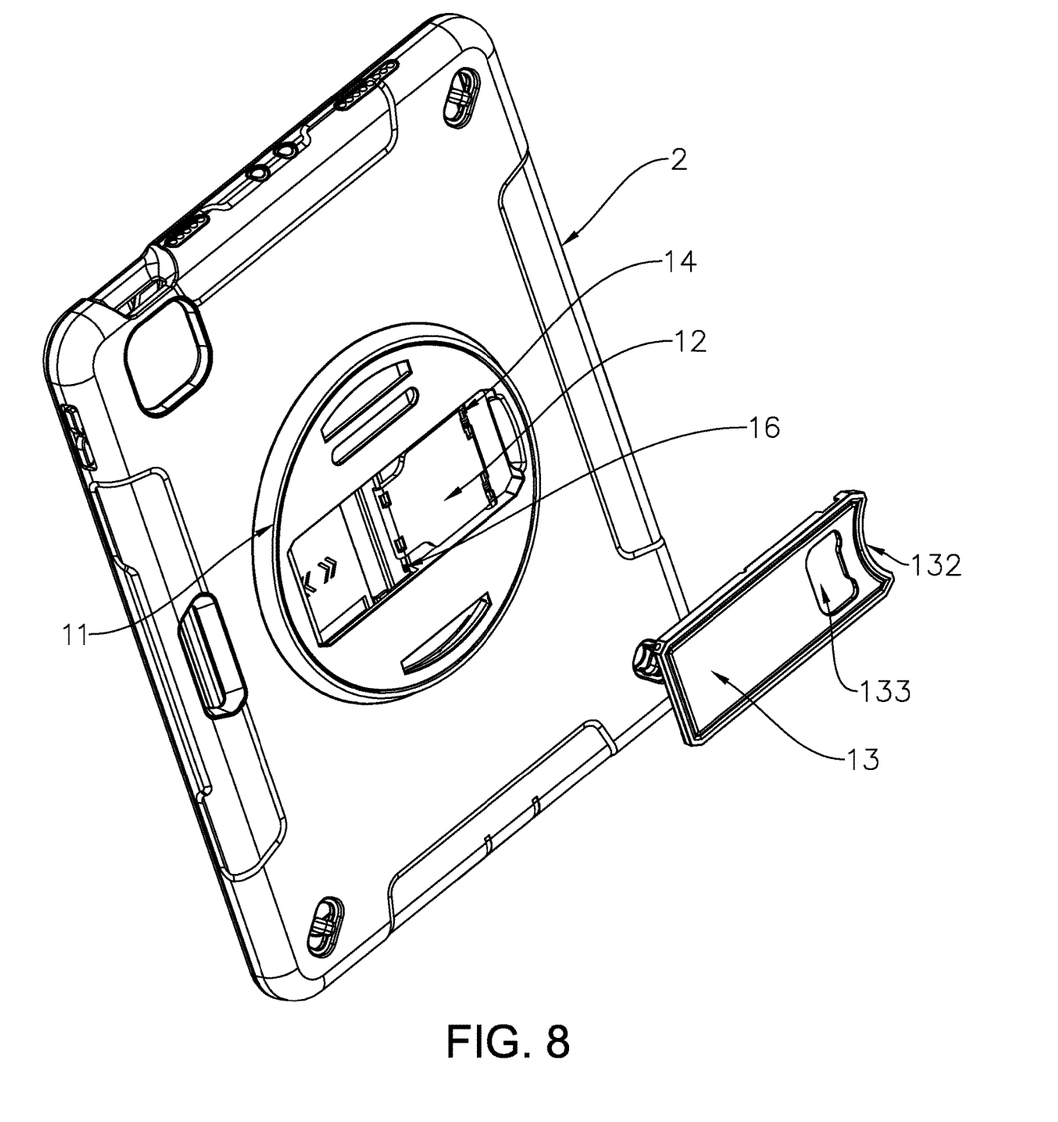
FIG. 8 is a schematic diagram of a structure of a support plate of a support structure for a protective housing of an electronic product according to the invention.
Figure 9:
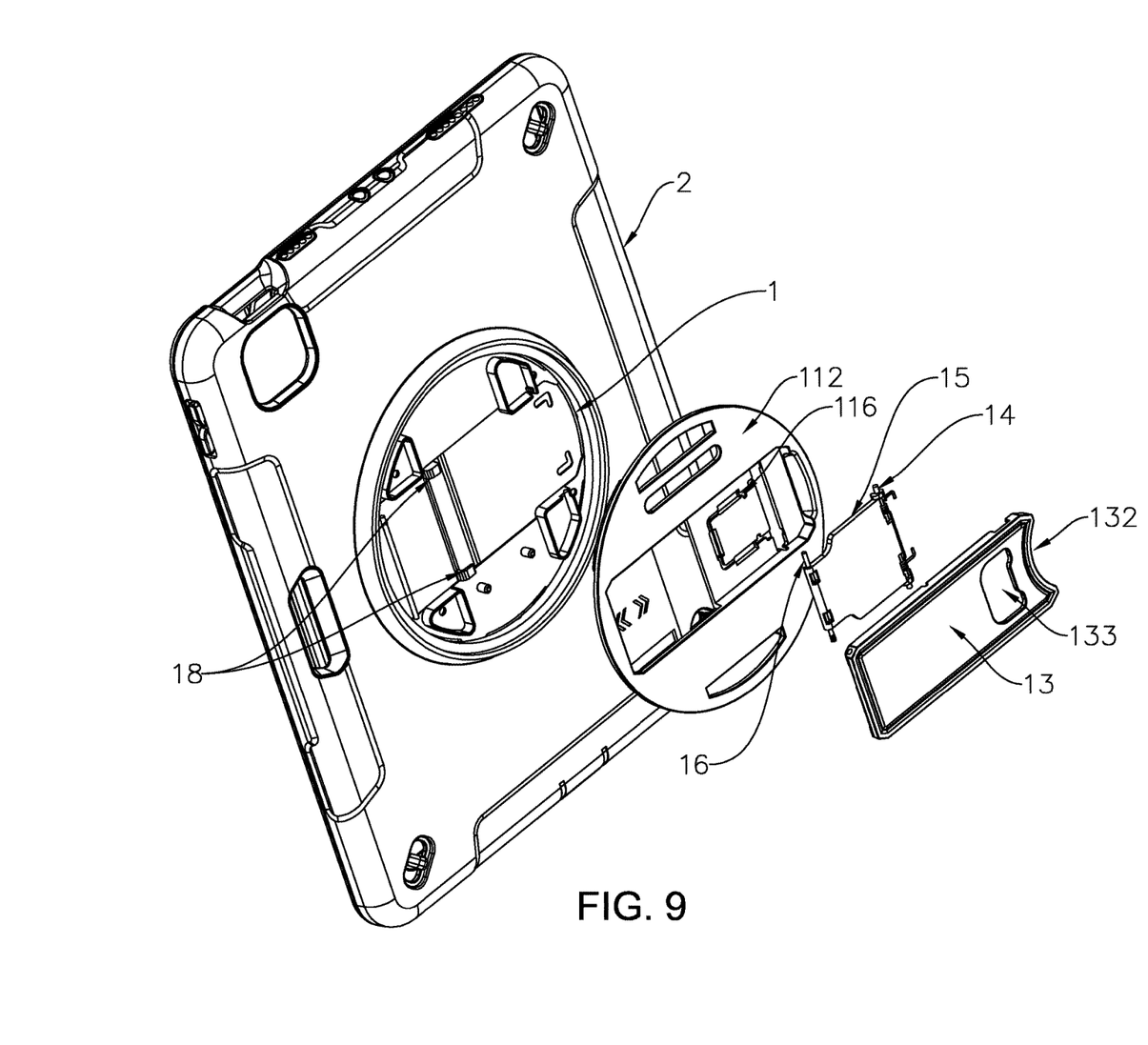
FIG. 9 is a schematic diagram of a structure of an inner partition plate of a support structure for a protective housing of an electronic product according to the invention.

A through hole 24 that is configured to install the support assembly 1 is opened in an inner part of the middle shell 22. At least one adjustment groove 25 is distributed with a same spacing on a side of the through hole 24, and the protrusion 117 is clamped with the adjustment groove 25. The inner partition plate 111 and the outer partition plate 112 are locked on two sides of the through hole 24. Refer to FIG. 6 and FIG. 7. After the inner partition plate 111 and the outer partition plate 112 are connected, the protrusion 117 may be switched in inner parts of a plurality of adjustment grooves 25 by rotating the protective housing connection plate 11, to adjust an angle of the protective housing connection plate 11. A main body of the protective housing assembly 2 is a protective housing for a tablet computer, but it is not limited to only the protective housing for a tablet computer. The support assembly 1 may also be used to a mobile phone or another electronic product that needs to use the protective housing.

As a specific technical solution of the invention, a positioning buckle 26 is disposed at four edges each of the middle shell 22, and a positioning groove 27 is disposed at four edges each of the surface cover 23. The positioning buckle 26 is clamped with the positioning groove 27. A pen groove 28 is opened in an inner part of the surface cover 23. The pen groove 28 is used to place a pen for PAD, and middle parts of surface cover 23 and the middle shell 22 are connected by clamping through the positioning buckle 26 and the positioning groove 27. Operations are simple and favorable for assembly.

During use, the support plate 13 is flipped through the handle groove 131 or the handle hole 132. Refer to FIG. 6. When the support plate 13 drives the sliding shaft 17 to slide in the inner part of the sliding groove 114, the sliding shaft 17 slides underneath the hook 18. As shown in FIG. 6, the inner part of the sliding groove 114 is located on the side of the hook 18, and the enough space for the sliding shaft 17 to move upward and downward is reserved. The support plate 13 continuously slides to apply the upward force on the sliding shaft 17, to enable the sliding shaft 17 to be opposite to the hook 18. In this case, by loosening the support plate 13, the support plate 13 and the sliding shaft 17 slide in the opposite direction due to the rebound of the torsion spring 15, and the sliding shaft 17 is clamped into the inner part of the hook 18 due to the limitation of the hook 18 and continuously resisted by the rebound force of the torsion spring 15. Therefore, the sliding shaft 17 may be stably clamped in the inner part of the hook 18. When the support plate 13 is accommodated, the support plate 13 is continuously flipped to drive the sliding shaft 17 to be separately from the inner part of the hook 18. When the support plate 13 is pulled, the support plate 13 drives the sliding shaft 17 to move to the bottom of the hook 18. When the support plate 13 is released, under the action of the rebound force of the torsion spring 15, the slant support plate 12 resets to pull the support plate 13, so as to drive the sliding shaft 17 to reset. Therefore, the support plate 13 may be accommodated in the inner part of the outer partition plate 112.

In conclusion, compared with a support for a protective housing on the market, according to the support structure for a protective housing of an electronic product, the rebound force is continuously applied to the slant support plate 12 and the support plate 13 through the torsion spring 15. Therefore, the support plate 13 is more stable when being clamped with the hook 18, and the support plate 13 and the slant support plate 12 are more stably accommodated. When the support plate 13 is separated from the limitation of the hook 18, the torsion spring 15 automatically drives the support plate 13 and the slant support plate 12 to be folded and accommodated. Therefore, operations are simple and fast, usage is more flexible, a structure is simplified streamlined structure, economic benefits are achieved, and an application prospect is broad.

While the invention has been described in terms of preferred embodiments, those skilled in the art will recognize that the invention can be practiced with modifications within the spirit and scope of the appended claims.

What is claimed is:

1. A support structure for a protective housing of an electronic product, comprising:
   a support assembly, wherein the support assembly comprises a protective housing connection plate, a slant support plate, and a support plate, one end of the slant support plate is disposed on a side of the protective housing connection plate in a rotation manner through a rotating shaft I, a torsion spring is sleeved on the rotating shaft I, and the other end of the slant support plate is disposed on a side of the support plate in the rotation manner of a rotating shaft II, one end of the support plate is disposed on the side of the protective housing connection plate in a sliding manner through a sliding shaft, and a hook that is configured to limit the sliding shaft is disposed in an inner part of the protective housing connection plate; and
   by flipping the support plate, the support plate drives the sliding shaft to slide in the inner part of the protective housing connection plate and is clamped with the hook, in this process, the slant support plate is pulled by the support plate, to flip and to compress the torsion spring, the support plate is flipped to drive the sliding shaft to separate from the clamping with the hook, and by loosening the support plate, the slant support plate is rebounded by the torsion spring, to drive the support plate to flip and to be accommodated in the inner part of the protective housing connection plate.

2. The support structure for a protective housing of an electronic product of claim 1, wherein the protective housing connection plate comprises an inner partition plate and an outer partition plate, a rotating groove and a sliding groove are internally opened on a side of the outer partition plate, the hook is disposed on a side of the inner partition plate, and one end, away from the inner partition plate, of the hook extends into an inner part of the sliding groove.

3. The support structure for a protective housing of an electronic product of claim 2, wherein the rotating shaft I is disposed in an inner part of the rotating groove in the rotation manner, the sliding shaft is disposed in the inner part of the sliding groove in the sliding manner, a hinge base is internally disposed on the side of the support plate, and the rotating shaft II is disposed in an inner part of the hinge base in the rotation manner.

4. The support structure for a protective housing of an electronic product of claim 2, wherein at least one limiting card that is clamped with one end of the torsion spring is disposed on a side of the slant support plate, and a clamping groove that is clamped with the other end of the torsion spring is internally opened on the side of the outer partition plate.

5. The support structure for a protective housing of an electronic product of claim 1, wherein a handle groove is opened on one end, away from the sliding shaft, of the support plate, and a handle hole is opened in an inner part of the support plate.

6. The support structure for a protective housing of an electronic product of claim 4, wherein an accommodation groove that is configured to accommodate the one end of the torsion spring and the limiting card is internally opened on the side of the outer partition plate, and the accommodation groove is connected to the rotating groove.

7. The support structure for a protective housing of an electronic product of claim 6, wherein at least one protrusion is distributed with a same spacing in a circular shape on an edge of the inner partition plate.

8. The support structure for a protective housing of an electronic product of claim 7, further comprising a protective housing assembly, wherein the protective housing assembly comprises a shell, a middle shell disposed in an inner part of the shell, and a surface cover disposed on a side of the middle shell.

9. The support structure for a protective housing of an electronic product of claim 8, wherein a through hole that is configured to install the support assembly is opened in an inner part of the middle shell, at least one adjustment groove is distributed with a same spacing on a side of the through hole, and the protrusion is clamped with the adjustment groove.

10. The support structure for a protective housing of an electronic product of claim 9, wherein a positioning buckle is disposed at four edges each of the middle shell, a positioning groove is disposed at four edges each of the surface cover, the positioning buckle is clamped with the positioning groove, and a pen groove is opened in an inner part of the surface cover.

\* \* \* \* \*